United States Patent
Wiens et al.

(10) Patent No.: US 11,604,127 B2
(45) Date of Patent: Mar. 14, 2023

(54) METHODS FOR DETECTING PIPELINE WEAKENING

(71) Applicant: University of Saskatchewan, Saskatoon (CA)

(72) Inventors: Travis Kent Wiens, Saskatoon (CA); Jeremy William ven der Buhs, Saskatoon (CA)

(*) Notice: Subject to any disclaimer, the term of this patent is extended or adjusted under 35 U.S.C. 154(b) by 187 days.

(21) Appl. No.: 16/647,917

(22) PCT Filed: Sep. 21, 2018

(86) PCT No.: PCT/CA2018/051192
§ 371 (c)(1),
(2) Date: Mar. 17, 2020

(87) PCT Pub. No.: WO2019/056121
PCT Pub. Date: Mar. 28, 2019

(65) Prior Publication Data
US 2020/0264084 A1    Aug. 20, 2020

Related U.S. Application Data

(60) Provisional application No. 62/561,915, filed on Sep. 22, 2017.

(51) Int. Cl.
*G01N 3/30* (2006.01)
*F17D 5/06* (2006.01)
(Continued)

(52) U.S. Cl.
CPC .............. *G01N 3/30* (2013.01); *F17D 5/06* (2013.01); *G01M 3/243* (2013.01); *G01M 3/36* (2013.01);
(Continued)

(58) Field of Classification Search
CPC ............ F17D 5/06; G01M 3/36; G01N 29/07; G01N 29/12; G01N 2291/0258;
(Continued)

(56) References Cited

U.S. PATENT DOCUMENTS 9,013,958 B2    4/2015 Zhang et al.
2004/0134280 A1*  7/2004 Hedberg ............ G01N 29/2418
                                                    73/578

(Continued)

FOREIGN PATENT DOCUMENTS

CA    2124258 A1    11/1995
CA    2324084 A1    10/1999
(Continued)

OTHER PUBLICATIONS

International Search Report and Written Opinion of corresponding International Application No. PCT/CA2018/051192 dated Jan. 4, 2019, 9 pages.

*Primary Examiner* — Nathaniel J Kolb
(74) *Attorney, Agent, or Firm* — Bereskin & Parr LLP

(57) ABSTRACT

Methods of detecting pipeline weakening are described herein. The methods include creating a pressure wave in a fluid flowing in a pipeline using an input transducer located at a first position along the pipeline; measuring the pressure wave using an output transducer positioned at a second position along the pipeline that is spaced from the first position, and generating an output signal based on the pressure wave; analyzing the output signal to determine a stiffness of a sidewall of the pipeline positioned between the input transducer and output transducer; and determining if
(Continued)

the sidewall includes a defect based on the stiffness of the sidewall, including analyzing a frequency response of the output signal to detect the defect.

7 Claims, 9 Drawing Sheets

(51) Int. Cl.
    *G01M 3/24*      (2006.01)
    *G01M 5/00*      (2006.01)
    *G01N 29/07*      (2006.01)
    *G01N 29/12*      (2006.01)
    *G01M 3/36*      (2006.01)
    *G01N 3/20*      (2006.01)

(52) U.S. Cl.
    CPC .......... *G01M 5/0025* (2013.01); *G01N 29/07* (2013.01); *G01N 29/12* (2013.01); *G01N 3/20* (2013.01); *G01N 2203/001* (2013.01); *G01N 2203/0069* (2013.01); *G01N 2291/011* (2013.01); *G01N 2291/0234* (2013.01); *G01N 2291/0258* (2013.01); *G01N 2291/02854* (2013.01); *G01N 2291/044* (2013.01); *G01N 2291/048* (2013.01); *G01N 2291/102* (2013.01); *G01N 2291/2636* (2013.01)

(58) Field of Classification Search
    CPC ... G01N 2291/02854; G01N 2291/044; G01N 2291/048; G01N 2291/102; G01N 2291/2636
    USPC .......................................................... 73/598
    See application file for complete search history.

(56) References Cited

U.S. PATENT DOCUMENTS

2011/0149688 A1*   6/2011   Hill .................. G01H 9/004
                                                               367/87
2018/0356046 A1*  12/2018   Gong .................. F17D 5/06

FOREIGN PATENT DOCUMENTS

| CA | 2875532 A1 | 12/2013 |
| CA | 2732937 C | 5/2017 |
| CN | 102588743 A | 7/2012 |
| WO | 201759542 A1 | 4/2017 |

* cited by examiner

METHODS FOR DETECTING PIPELINE WEAKENING

TECHNICAL FIELD

The embodiments disclosed herein relate to pipelines, and, in particular to methods for detecting pipeline weakening.

BACKGROUND

Long pipelines may be common in some industries that refine materials. Such industries are oil and gas, chemical production, and mining. These pipelines may contain slurries which contain water as the working fluid to transport solids such as sand, clay, and tailings. Pipelines are one method of moving solid partials over long distances in a continuous production environment. Internal pipe erosion can be a downside of this method of material transport. Erosion may be caused from the action of solid particles contacting the pipe wall and removing small amounts of material over time. As a result, the wall thickness of the pipe may become thinner to the point, where if not sufficiently repaired and/or replaced, it may result in a leak or burst. Pipeline corrosion, such as by electrochemical means, can also be a concern. If the pipeline is pressurized (i.e. at greater than atmospheric pressure), leaks in the pipeline may have a relatively high flow rate (based on the operating pressure), which may lead to safety hazards and/or environmental contamination. Monitoring internal defects is not an easy task as there are typically few/no indicators of internal wear that are visible to a user on the exterior of the pipe.

Guided wave ultrasonic inspection is one existing method that can use either piezoelectric or electromagnetic acoustic transducers to transmit and measure stress waves along the axial direction of the pipeline. Wave reflections in the pipe material are measured and recorded then analyzed to determine pipeline health, and defect location. Another similar method is guided wave magnetosctrictive inspection which works off of the same principle as ultrasonic inspection, however it measures stress waves in ferromagnetic pipes by its changing magnetic induction. While these methods are effective, they are rather expensive and complex due to their specialized piezoelectric, acoustic, and magnetostrictive sensor technology.

A much simpler and less costly option would be to monitor the dynamic fluid response within the pipeline using readily available and affordable pressure transducers. Pipeline erosion, corrosion, as well as other defects can be seen within the dynamic response of the fluid. This is due to the fact that the pressure wave speed is not only a function of the fluid parameters, but also the mechanical and geometrical parameters of the pipeline or duct conveying the fluid. Extensive research has been performed into the detection of leak defects in pipelines by analyzing the fluid dynamic response. Transient responses for leaks, bursts, diameter and material changes, and air cavities have also investigated.

Others have investigated leak detection by looking at the impulse response of the pipeline. The addition of leakage into the pipeline creates impulse reflections in the response, which can be detected. Since a pipeline is a distributed system, its impulse response is location dependent. Although leaks may be detected in the impulse response using a cross correlation technique, the proposed methods generally require the placement of pressure transducers all along the pipeline and analyzing the impulse response at each point. These techniques do not explore other pipeline faults such as erosion, corrosion, diameter changes, and changes in material properties.

The frequency response of the pipeline may also highlight important features. For example, researchers have developed a detailed algorithm for detecting leaks in a pipe by exclusively looking at the frequency response. While this research looks at leak detection only, it has been shown that the frequency response is significantly affected for a pipe with erosion, corrosion, and other defects as well.

Accordingly, there is a need for improved methods of detecting pipeline weakening.

SUMMARY

In accordance with in broad aspect, there is a method of detecting pipeline weakening including superimposing a signal into one of a liquid flowing in a pipeline or at an inlet of the pipeline, measuring the signal at an outlet of the pipeline, and analyzing a frequency response of the signal to detect weaknesses in the pipeline between the inlet and the outlet.

In accordance with another aspect of the method, the signal may be one of a pressure signal or a flow signal.

In accordance with another aspect of the method, the superimposing the signal may be by a valve restricting flow of the liquid at the inlet.

In accordance with another aspect of the method, the superimposing the signal may be by a transmitter at the inlet.

In accordance with another aspect of the method, the transmitter may be a piezoelectric speaker.

In accordance with another aspect of the method, the signal may be an impulse or wide-band signal averaged over a period of time.

In accordance with another aspect of the method, the measuring the signal may be by a pressure transducer.

In accordance with another aspect of the method, the analyzing the frequency response of the signal may be by a Transmission Line Method.

In accordance with another aspect of the method, the Transmission Line Method may account for an elasticity of the pipeline.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 1:
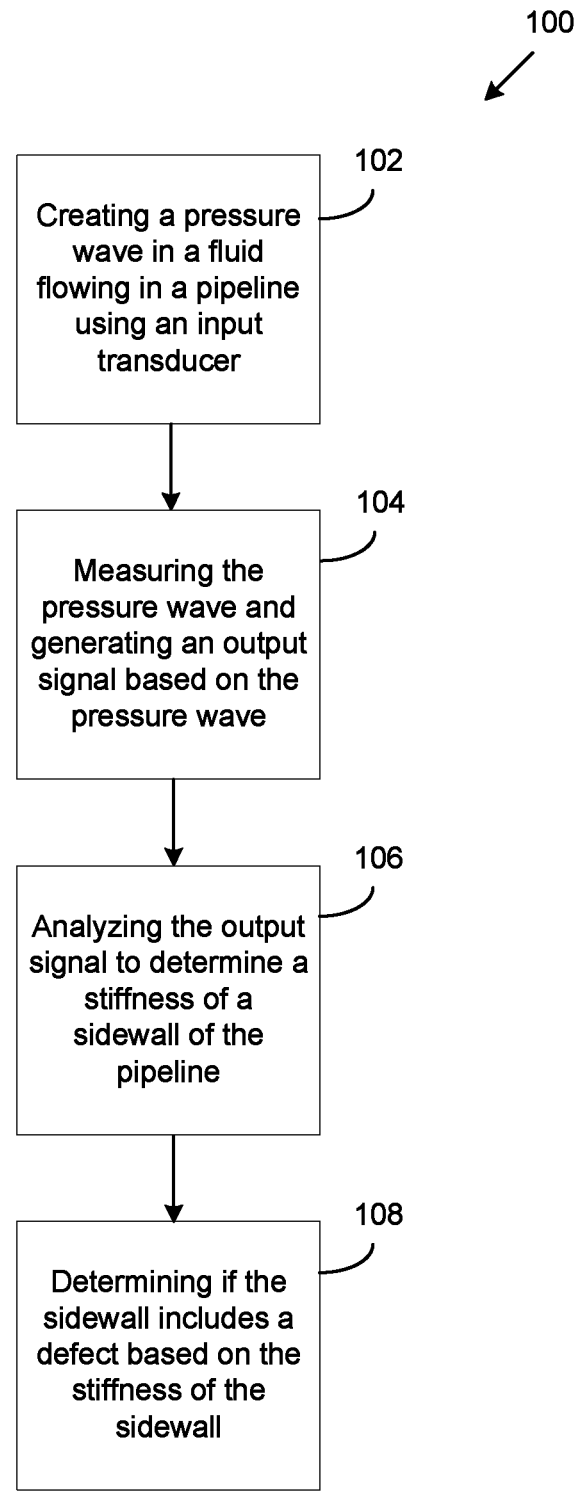
FIG. 1 is a block diagram of a method of detecting pipeline weakening, according to one embodiment.

Various apparatus, systems and processes will be described below to provide an example of each claimed embodiment. No embodiment described below limits any claimed embodiment and any claimed embodiment may cover apparatus, systems or processes that differ from those described below. The claimed embodiments are not limited to apparatus, systems or processes having all of the features of any one apparatus, system or process described below or to features common to multiple or all of the apparatus, systems or processes described below.

The propagation of a pressure wave travelling through a fluid-filled pipe may be influenced by the stiffness of the surrounding pipe material (i.e. the pipe sidewall). If the pipe sidewall were to be damaged over time, such as by erosion or corrosion, the relative, local thickness of the pipe sidewall may decrease and its stiffness may also decrease.

Currently, pipe sidewall thickness can be measured using radiographic measurement techniques, such as by using a "pig" (an apparatus that fits within and travels along the pipeline) or by external measurements. Such external methods can require direct access to the surfaces of the pipe, which may be difficult to access if the pipeline is buried, submerged or located in an otherwise hostile environment. Internal inspection techniques, such as using a suitable pig, may require the pipeline to be shutdown and at least partially drained of the fluid during inspection.

Therefore, the inventor has developed a system and method for detecting the thinning of a pipe sidewall, preferably prior to the failure and/or leakage of the sidewall, by monitoring the changes in the frequency response of pressure waves travelling through the fluid contained in the pipeline. This method may be performed while the pipeline is in use, and does not require the operation of the pipeline to be halted or substantially modified.

This technique may be used to monitor the condition of pipelines carrying a suitable fluid, such as a liquid, a gas, slurry, brine and the like. The techniques described herein may be used on relatively short and relatively long pipelines.

For example, if a pressure or flow wave is generated in the fluid contained in a pipeline, its propagation speed may be affected by the combination of the compressibility of the fluid and the stiffness/compressibility of the sidewall of the pipeline itself. Changes in the stiffness of the pipeline, along its length, may generate internal pressure wave reflections.

Therefore, a system for monitoring the condition of the pipeline may be configured to superimpose a pressure or flow signal in the fluid contained within the pipeline, at a first/input location. This signal may be introduced using any suitable mechanism as an input transducer (including by using a valve to restrict flow in relatively small pipes and using a transmitter/transducer), or may be the natural variations in pressure, for example due to pump ripple. The signal introduced may be an impulse or wide-band signal that can be averaged over a relatively long period of time. A pressure transducer (of any suitable type) may be positioned at a second, output location to detect the pressure signal conveyed through the fluid. One or more properties of the signal can be analyzed to determine corresponding attributes of the sidewall(s) of the pipeline.

For example, the frequency response of the pressure signal as it travels through the fluid in the pipeline may be measured (e.g. magnitude of the pressure wave response vs frequency). This may help the system determine if sidewall of the pipeline has one or more regions with reduced sidewall thickness, or other such defects. This frequency-based analysis may also help determine the magnitude of the change in the sidewall thickness—e.g. the amount of material that has been eroded/corroded and the magnitude of the change in the pipeline internal diameter.

Optionally, the system may also be configured to monitor the impulse response (i.e. the time response of the pressure wave reflection within the fluid) of the pressure wave to help determine the position of a damaged portion of the pipeline. For example, the impulse response analysis may help determine how far the damaged section of the pipeline is spaced from the system transducers.

Preferably, a pipeline monitoring system may be configured to selectably monitor both the frequency and impulse responses of the pressure waves introduced into the system. This may help the system determine the existence of a defect in the pipeline sidewall, as well as its magnitude (frequency response) and location (impulse response). In some embodiments, the frequency response analysis may be conducted on an ongoing, or generally ongoing basis (at any suitable sampling rate/frequency, such as once a minute, once an hour, once a day, once a week, once a month, once a year and the like), while the impulse response need not be monitored at the same time. If, however, the frequency response analysis indicates the existence of damage, then the system may trigger the impulse response analysis to help localize the location of the detected damage. If the frequency response analysis does not detect any damage, it may be unnecessary to run the location-finding, impulse response analysis.

The input and output transducers may be controller using any suitable controller, such as a computer, PLC or the like, which may also perform at least some of the analysis on the pressure wave signals and/or generate a suitable user output.

Optionally, multiple pairs of input transducers (signal generators) and output transducers may be provided to monitor different segments along the length of a single pipeline. Each pair of transducers may be used to monitor the condition of the pipeline sidewall extending between the transducers. The number of segments, and corresponding transducer pairs, used to monitor a given pipeline may be determined based a variety of factors, including, for example, pipeline length, expected wear and pipeline condition, pipeline accessibility and the like. The information gathered from each segment may be analyzed individually (e.g. to determine the condition of the respective segment), collectively (e.g. to determine an overall condition of the overall pipeline) and a combination of both.

Optionally, the monitored segments of the pipeline may be relatively straight sections, and may not include significant curves/corners. Preferably, if a corner is not included in a monitored segment, the portions of the pipeline upstream and downstream from the corner can be monitored. Alternatively, one or more corners may be located in a measured pipeline segment (i.e. between the input and output transducers).

In some embodiments, the method of monitoring the condition of a sidewall of a pipeline may include the steps of introducing a pressure wave into the fluid travelling through the pipeline, using an input transducer provided at a first location. The method can also include detecting at least one attribute of the pressure wave using an output transducer provided at a second location that is spaced apart from the input transducer. The output transducer may be located upstream or downstream relative to the input transducer.

The output transducer can generate an output signal that can be analyzed in a frequency domain to determine if the sidewall has any relatively thinner regions, and/or in a time domain to help determine where such relatively thinner regions are located along the length of the sidewall being monitored.

Referring to FIG. 1, illustrated therein is a method of detecting pipeline weakening 100. Method 100 includes, at step 102 creating a pressure wave in a fluid flowing in a pipeline using an input transducer located at a first position along the pipeline. The fluid flowing in the pipeline may be a liquid, a gas, a solution, a slurry, a brine and the like. Further, it should be noted that the fluid can be homogenous or can be heterogeneous (e.g. contain suspended particulates). In one embodiment, the pressure wave can be created using a mechanical device such as by actuating a valve. For example, for relatively smaller pipelines (such as those with a diameter of less than 10 inches, or about 1-3 inches), relatively fast acting valves may be used to create a pressure wave. In another example, a pressure wave may be created by rapid valve operation. In another embodiment, the pressure wave may be created by a transducer. This may be useful in pipelines that include valves that are not sufficiently fast acting to produce the desired pressure waves. For example, a pressure wave may be created using a fast acting transducer such as a piezoelectric speaker or, more specifically, a frequency response of a pipeline could be generated using a piezoelectric speaker using a maximum length sequence (MLS). A MLS signal is digital pseudo-random signal that is spectrally white, ensuring equal power transmitted throughout the desired frequency range. This may provide that the frequency response is clear, and could provide for comparisons between eroded and nominal pipelines. Using a MLS signal may also provide for the generation of an impulse response when the output is cross correlated with the input, which has been done to detect leakage in pipelines. Alternately, other wideband signals other than the MLS signal may be generated, such as white noise or swept sine wave.

At step 104, the pressure wave is measured using an output transducer positioned at a second position along the pipeline, either upstream or downstream. The second position is spaced from the first position.

Further, at step 104, an output signal is generated by the output transducer based on the pressure wave. In another embodiment, the transducers may be fast responding pressure transducers, such as piezo-electric transducers. For example, a frequency response of the pressure signal as it travels through the fluid in the pipeline may be measured. In one embodiment, measuring the frequency response may provide an aggregate thickness of the pipeline over the distance between the first position and the second position. Further, measuring the frequency response of the pressure signal may provide a change in the sidewall thickness of the pipeline (e.g. an amount that the diameter of the pipeline has increased from inception).

In another example, an impulse response of the pressure signal as it travels through the fluid in the pipeline may also be measured. The impulse response of the pressure signal may be used to determine a position of a defect between the first position and the second position of the pipeline. At step 106, the output signal is analyzed to determine a stiffness of a sidewall of the pipeline positioned between the input transducer and output transducer. In one embodiment, the output signal may be analyzed by a Transmission Line Method (as described further in the Examples section, below As discussed above, analysis of the frequency response of the output signal may provide an aggregate thickness of the pipeline over the distance between the first position and the second position.

At step 108, it is determined if the sidewall includes a defect based on the stiffness of sidewall. The aggregate thickness of the pipeline over the distance between the first position and the second position can then be used to determine the existence of a defect at a position between the first position and the second position. Following this determination, the impulse response of the pressure signal can optionally be analyzed to determine the position of the defect between the first position and the second position. The position of the defect may be represented by either a negative or a positive impulse.

EXAMPLES

An analysis was performed using detailed modelling of a fluid pipeline. There are excellent models available for modelling the dynamics of fluid within long transmission lines. Modelling and simulating hydraulic transients can be complex due to the lack of an exact solution to the Navier-Stokes equations describing the flow. As a result, to help model and simulate the flow dynamics, approximations can be computed. There are numerous approximation techniques available, and a detailed study performed by Soumelidis et al. (2005) compares the current state-of-the-art in modelling and approximating hydraulic transients. In their study, the Transmission Line Method (TLM) has shown to provide an accurate solution, while being simple to implement and fast to simulate.

Uniform Pipelines

The TLM was initially introduced by Krus et al. (1994), and has been improved over the years to accurately model more complicated effects such as frequency dependent friction. Further effects on fluid flow such as pipe wall elasticity have also been accurately accounted for in the model, and the models used in this analysis. In order to quantify the effects of pipeline weakening on the dynamics of fluid flow, the TLM with elastic wall effects was used.

Figure 2:
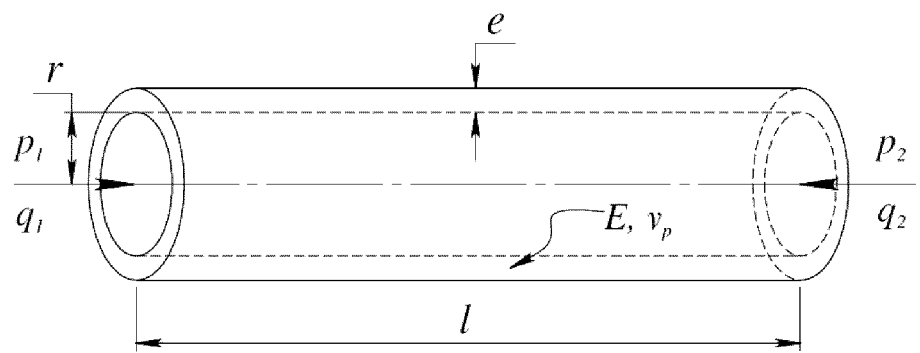
FIG. 2 is a schematic drawing of an elastic walled transmission line pipeline, according to one embodiment.

A schematic of one example of an elastic pipeline is shown in FIG. 2. A transmission line model has 2 ports (inlet, 1, and outlet, 2) and 4 states (pressure, p, and flow, q, at both inlet and outlet). The pipeline has a radius, r, wall thickness, e, and mechanical properties of Young's modulus, E, and Poisson's ratio, $v_p$, that remain unchanged along the length.

Figure 3:
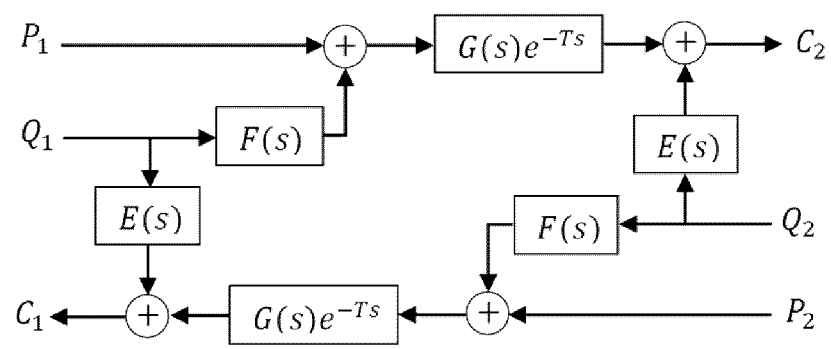
FIG. 3 is a block diagram showing the Transmission Line Method.

The TLM is comprised of a network of linear transfer functions, E(s), F(s), and G(s) with time delays, $e^{-Ts}$, accounting for wave propagation effects. The model is represented in the frequency domain, but is simulated in the time domain using the inverse Laplace transform which was found for linear transfer functions. The arrangement is shown in the block diagram of FIG. 3. The block diagram can be simplified into a matrix relating the inlet states to outlet states by the following equation, where T is the transmission matrix:

$$\begin{pmatrix} P_1 \\ Q_1 \end{pmatrix} = \begin{pmatrix} t_{11} & t_{12}Z_c \\ t_{21}Z_c^{-1} & t_{22} \end{pmatrix} \begin{pmatrix} P_2 \\ Q_2 \end{pmatrix} = T \begin{pmatrix} P_2 \\ Q_2 \end{pmatrix}. \quad (1)$$

The characteristics $C_1$ and $C_2$ are related to pressure and flow using the pipeline's characteristic impedance $Z_c$:

$$P_1 = C_1 + Z_c Q_1 \quad (2)$$

$$P_2 = C_2 - Z_c Q_2. \quad (3)$$

One parameter to be monitored is the elastic wave speed, $c_e$, of the pipeline defined as:

$$c_e = \sqrt{\frac{\frac{K}{\rho}}{1 + \alpha \frac{2Kr}{eE}}}, \quad (4)$$

where the axial effects are accounted for by:

$$\alpha = \begin{cases} 1 - \frac{v_p}{2} & \text{Anchored upstream,} \\ 1 - v_p^2 & \text{Anchored throughout,} \\ 1 & \text{Anchored with expansion joints.} \end{cases} \quad (5)$$

The parameters in these equations are defined in Table 1.

TABLE 1

Fluid and pipe material properties

| Parameter | Value | Unit |
|---|---|---|
| Water bulk modulus, K | 2.15 | GPa |
| Water kinematic viscosity, v | 1.004 | cSt |
| Water density, ρ | 1000 | kg/m³ |
| Steel Young's modulus, E | 190 | GPa |
| Steel Poisson's ratio, $v_p$ | 0.3 | — |

Pipelines with Localized Erosion

Figure 4:
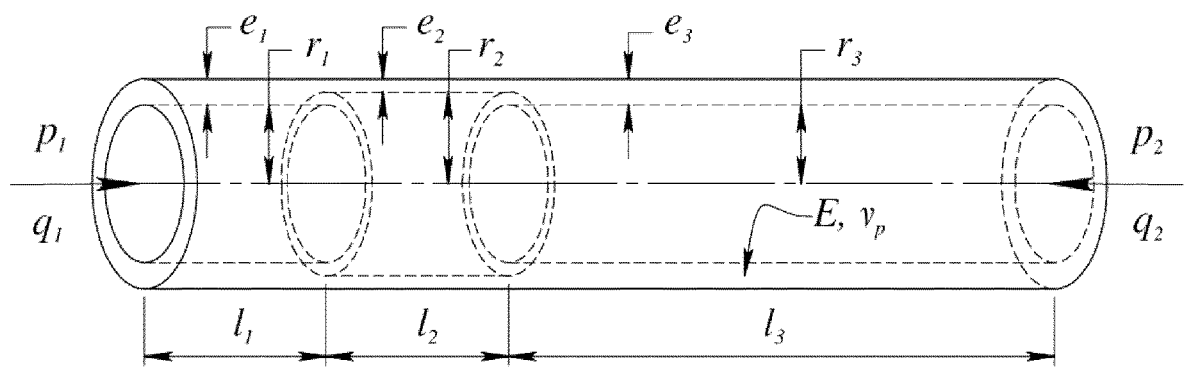
FIG. 4 is a schematic drawing of an elastic pipeline with localized erosion.

The dynamic model presented up until this point considers one section of pipeline with generally unchanging parameters. For a pipeline with localized erosion and wall thinning, shown schematically in FIG. 4, the overall transmission matrix T is computed by concatenating the individual transmission matrices $T_i$ of each uniform section from the inlet to outlet given by Equation (6):

$$\begin{pmatrix} P_1 \\ Q_1 \end{pmatrix} = \left( \prod_{i=1}^{N} T_i \right) \begin{pmatrix} P_2 \\ Q_2 \end{pmatrix} \quad (6)$$

Using the provided dynamic models, two different analysis techniques can be performed. The first technique analyzes the pipeline in the frequency domain using Equation (6) for pipelines of localized erosion, and Equation (1) for unaffected pipelines or pipelines with uniform erosion. The other technique looks at the impulse response of the pipeline, simulated in the time domain using MATLAB® SIMULINK®, and the block diagram structure shown in FIG. 3. For these investigations, the pipe material is assumed to be steel and the working fluid is water. The properties, provided in Table 1, for these materials are used in the TLM pipeline model, and are used for all simulation work presented in this section.

Frequency Response Analysis

The frequency response of a system can be understood to be the relation of its output to input as a function of signal frequency for linear time-invariant (LTI) systems. Two metrics are used to quantify this relationship, those being the magnitude ratio and phase difference between the signals. In this example, three pipelines were analyzed in the frequency domain. The dimensions of these lines are shown in Table 2, and correspond to the dimensions indicated in FIG. 4. All pipelines had a total length of 100 m, but had differences in diameters and wall thickness due to unique erosion events. Pipeline A was considered a nominal pipeline, being in new condition. Pipeline B was a pipeline with an even amount of erosion occurred over the entire length of the line. Lastly, Pipeline C had an occurrence of localized erosion located at the central 10 m of the pipeline.

TABLE 2

Pipeline dimensions for theoretical investigation

| | $l_1$ (m) | $l_2$ (m) | $l_3$ (m) | $r_1$ (cm) | $r_2$ (cm) | $r_3$ (cm) | $e_1$ (mm) | $e_2$ (mm) | $e_3$ (mm) |
|---|---|---|---|---|---|---|---|---|---|
| Pipeline A | 100 | — | — | 6.35 | — | — | 6 | — | — |
| Pipeline B | 100 | — | — | 6.85 | — | — | 1 | — | — |
| Pipeline C | 45 | 10 | 45 | 6.35 | 6.85 | 6.35 | 6 | 1 | 6 |

Figure 5:
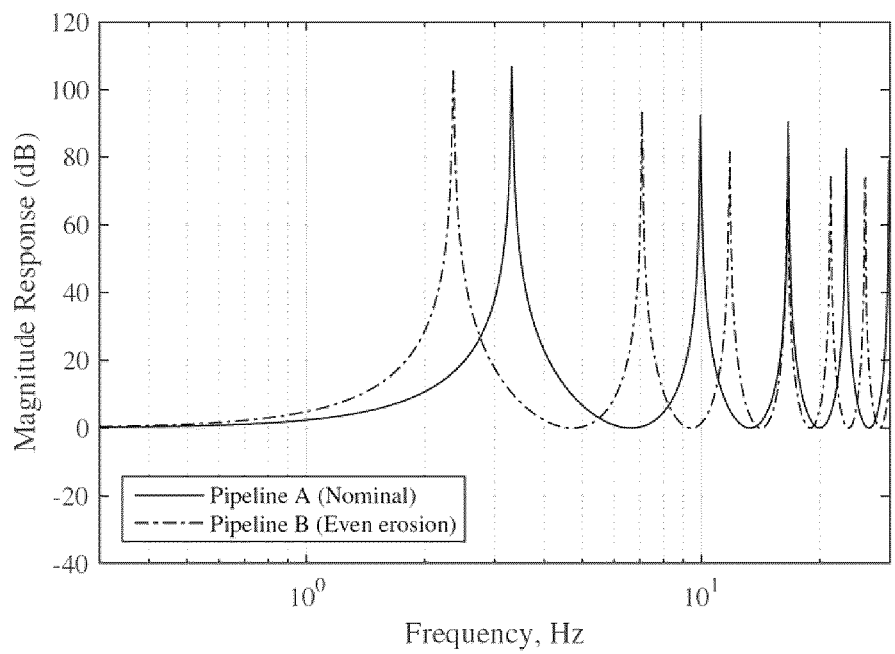
FIG. 5 is a graph showing magnitude response for nominal and evenly eroded pipe.

The first comparison examines the magnitude response of the nominal Pipeline A and evenly eroded Pipeline B. FIG. 5 shows a significant difference in the location of the resonant peaks located in the magnitude response. The resonances of Pipeline B are located at lower frequencies compared to Pipeline A, which can be seen as a frequency shift to the left of Pipeline A. This difference is understandable as the eroded line has less pipe wall thickness thus making the pipeline less mechanically stiff as the nominal pipeline. As a result, the pipeline may become generally more compressible due to the increased flexibility of the pipe wall. This may lead to a lower wave speed in the pipeline, thus decreasing the resonating frequencies of the line itself. Another feature of the magnitude response is the relatively low power asymptote. Looking at both pipelines in FIG. 5, the responses are asymptotic at a decibel (dB) value of 0, thus indicating the magnitude ratio of output to input is never less than 1. This asymptote can be seen for pipelines with uniform properties and dimensions over the entire length, which is true for both Pipeline A and B.

Figure 6:
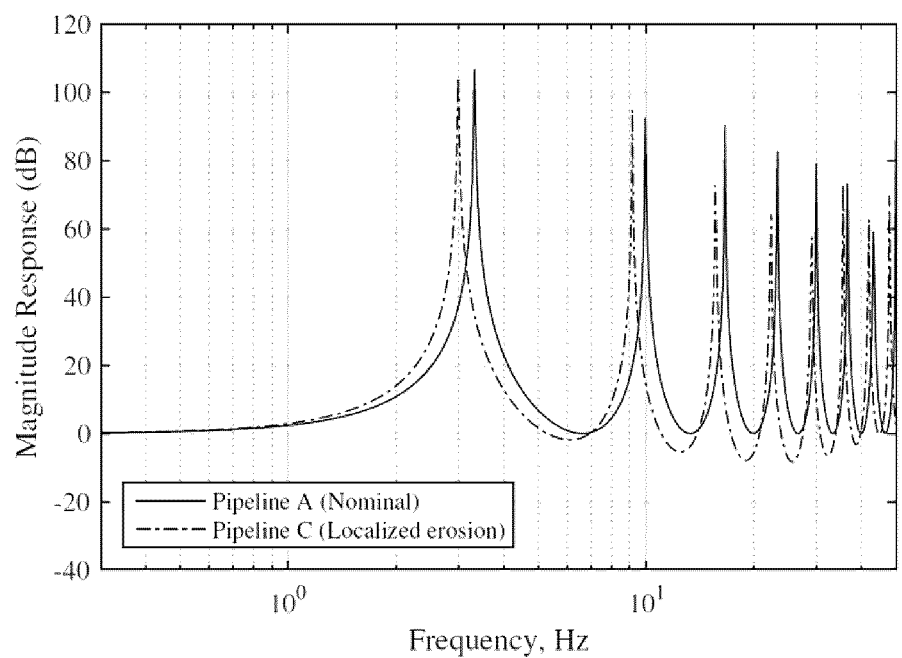
FIG. 6 is a graph showing magnitude response for nominal and locally eroded pipe.

The next comparison is between the nominal Pipeline A and the locally eroded Pipeline C. FIG. 6 again has noticeable differences in the magnitude response between the two lines. The resonant frequencies are again shifted to the left compared to the nominal line, however not to the extent of Pipeline B. This shift is, again, expected as the overall stiffness of the pipeline has been reduced due to the presence localized erosion. Since only 10 m of the pipe is eroded (10% of the overall length) with the rest of the line with nominal dimensions, this change in mechanical stiffness and overall compressibility is realized as a smaller frequency shift. An interesting feature in the magnitude response with localized erosion is the magnitude shift in the magnitude peaks and low power asymptote. In this case the asymptote is not at a value of 0 dB, but rather sloping downwards then upwards as frequency is increased. This indicates that the magnitude ratio between output and input is below 1 for certain frequencies. The magnitude peaks also seem to follow this similar shift.

Impulse Response Analysis

The impulse response is the output of a LTI system when an impulse is applied as the input. An impulse is an ideal function that is zero for all samples in the signal except for one sample where its magnitude is infinitely large. Realistically, an impulse is a pulse waveform with a very small duty cycle. Simply put, the impulse response of a system is its output to an extremely brief input. The impulse response for Pipelines A and B did not reveal detailed location information as they are uniform pipelines. Pipeline C, however, yields an impulse response at the pipeline inlet. In order have better understanding of what the impulse response can demonstrate, the time values of the simulation, t, were scaled with the effective wave speed of the pipeline defined by:

$$c_{\textit{eff}} = \frac{\sum_{i=1}^{N} l_i}{\sum_{i=1}^{N} \frac{l_i}{c_{e,i}}}. \quad (7)$$

Figure 7:
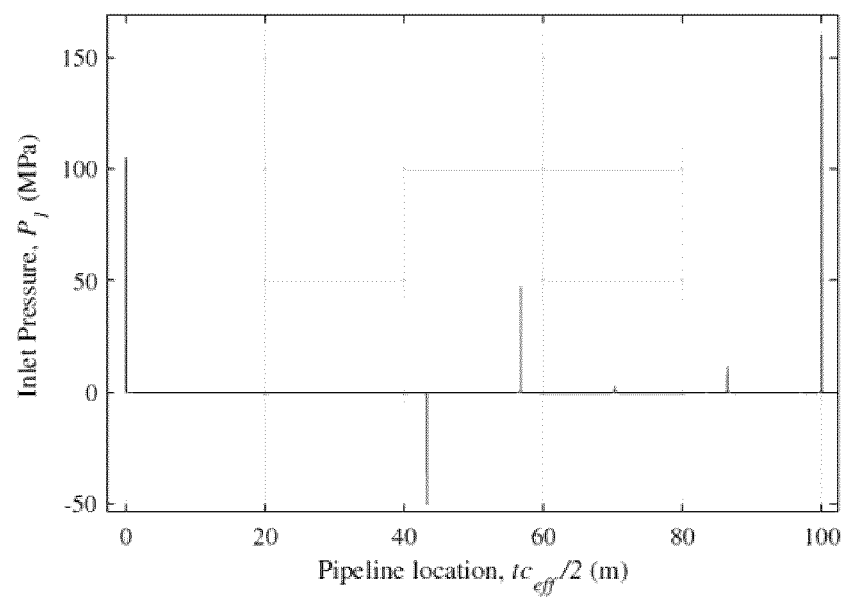
FIG. 7 is a graph showing impulse response of the inlet pressure with impulse applied to the inlet flow where the outlet port of Pipeline C is blocked.

The impulse simulation was set up to have a blocked outlet, and was given an impulse in inlet flow. The measured impulse response shown in FIG. 7 is that of the inlet pressure. When scaled using the effective wave speed, $c_{\textit{eff}}$, more insights into the location of erosion events can be gathered. The impulse at 0 m is that due to the flow impulse provided at the inlet. The large positive impulse at 100 m is due to the hard reflection from the blocked end of the pipeline. The first negative impulse in the response indicates the location of where the erosion begins within the pipeline due to the increase in diameter and reduction in wall thickness. The positive impulse after that is due to the reflection off of the reduction of diameter indicating the end of the erosion. Pipeline C has 10 m of erosion occurring in the middle of the pipeline, which compares well with the negative-positive impulse pair present in FIG. 7. The smaller positive impulses indicated on the ladder half of the pipeline may be caused by the small nodes connecting each pipe section together, however this is not certain.

Wave Propagation Simulation

Figure 8:
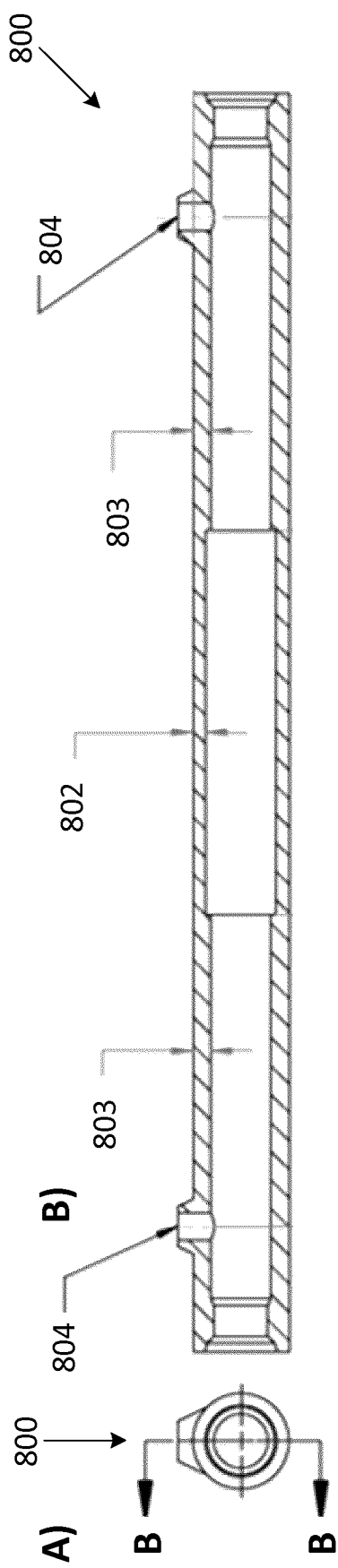
FIGS. 8A and 8B are an end view and a cross-sectional view, respectively, of a small-scale pipeline having a section of reduced wall thickness.

Two small-scale pipeline apparatuses were constructed: a first pipeline with a constant wall thickness and a second pipeline 800 with a section of reduced wall thickness 802 in the middle of two sections of constant thickness 803, as shown in FIGS. 8A and 8B. The pipeline also had two pressure transducer ports 804 on either side of the section of reduced wall thickness 802 This small scale pipeline was constructed of PLA plastic and the dimensions were selected to have a similar dissipation number as a full-scale pipeline, while the thinned section was selected to result in a similar reduction in wave speed as would be expected in a worn pipeline.

A piezo acoustic source was connected to one end of the pipeline 800 and a valve was connected to the other end. The pipeline 800 was mounted vertically with the valve at the top end. The pipeline 800 will filled with Nuto H68 hydraulic oil. All air bubbles were allowed to rise to the top and the valve was closed, ensuring the test section was fully filled with hydraulic oil with no air bubbles.

An acoustic signal was transmitted at the inlet, consisting of a Maximal Length Sequence with a length of 8191 samples and a sample rate of 24 kHz, which was repeated to improve signal to noise ratio.

Dytran 2200C charge mode pressure transducers were used to record the signal at the inlet and (blocked) exit. The multiple repetitions of the sequence were averaged in the time domain. An empirical transfer function estimate (ETFE) was calculated by applying the Discrete Fourier Transform to the inlet and outlet signal and then dividing the outlet by the inlet in the frequency domain.

Figure 9:
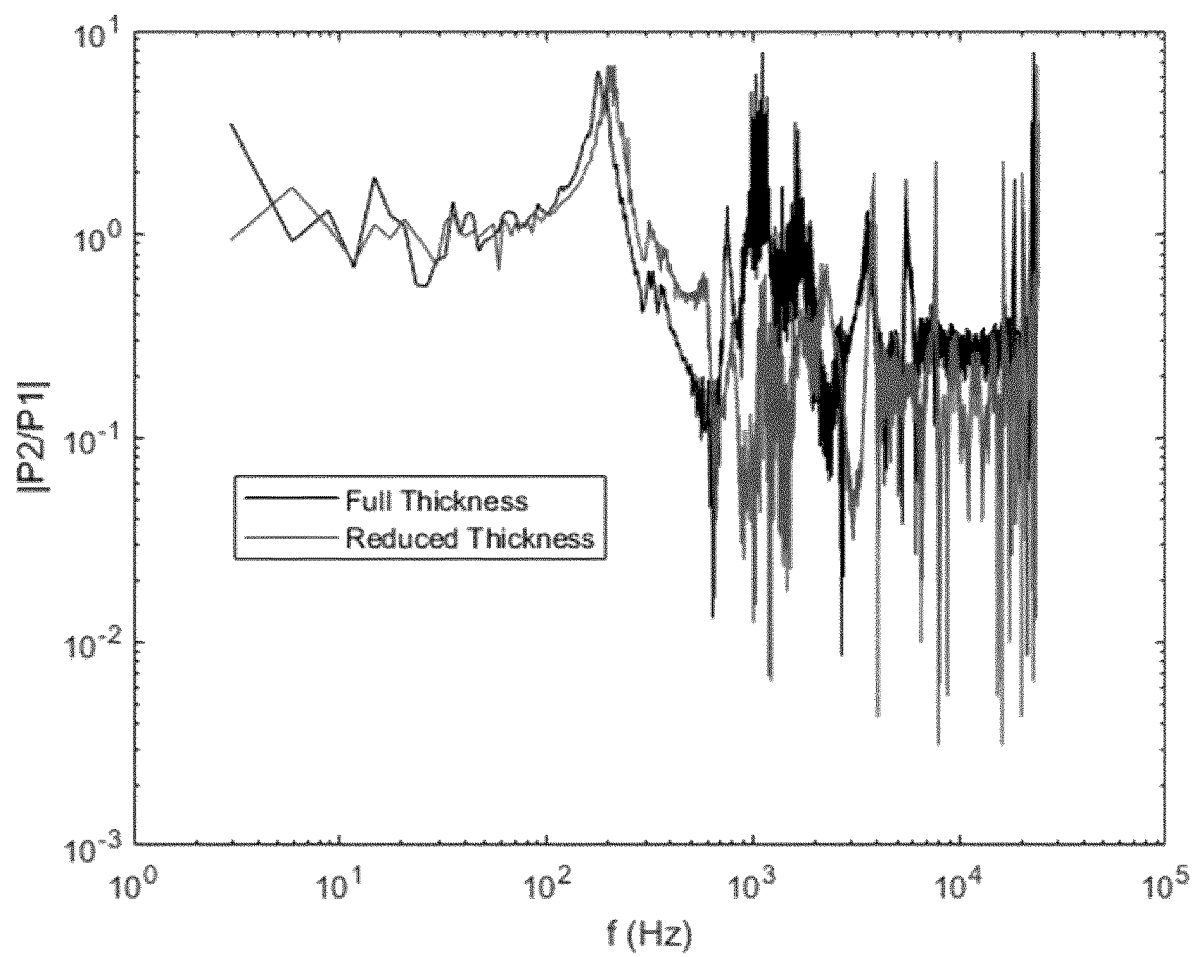
FIG. 9 is graph showing ETFE magnitudes for a small-scale pipeline having a constant wall thickness and a small-scale pipeline having a section of reduced wall thickness.

The ETFE magnitude for the two apparatuses is shown in FIG. 9. The results show the average of 515 repetitions in the full thickness case and 509 repetitions in the reduced pipe wall case. The frequency of the first peak (around 200 Hz) was shifted and the magnitude of the response at frequencies above the first peak are considerably different.

As shown in FIG. 9, the resulting frequency response of a pipeline with reduced wall thickness appears significantly different from one with a constant thickness.

The embodiments herein provide some examples of aspects of a system that could continuously monitor the health of fluid pipelines. The system may measure a dynamic response of the fluid and may not require measurement of the mechanics of the pipeline itself. When looking at the frequency response of the pipeline, pipeline health may be monitored by analyzing resonant peaks measured and comparing them to the response of the pipeline when it was initially installed (nominal). While frequency shifting may provide a general sense of pipeline health, the shifting of the peak magnitudes and low power asymptotes may give further insights into the defect including location, type of defect, and severity. The output of the impulse response has shown that by scaling the time domain with the effective wave speed of the pipeline may yield location dependent results. Defects may be seen as negative or positive impulses within the response depending on the type of defects. The impulse analysis may provide technicians with a defect's location, providing for them to investigate further and schedule repairs.

While the above description provides examples of one or more apparatus, methods, or systems, it will be appreciated that other apparatus, methods, or systems may be within the scope of the claims as interpreted by one of skill in the art.

The invention claimed is:

1. A method of detecting erosion within a sidewall of a pipeline, the method comprising:
   a) introducing a pressure wave into a fluid flowing in the pipeline using an input transducer located at a first position along the pipeline, the input transducer being a piezoelectric speaker;
   b) measuring an attribute of the pressure wave in the fluid and generating an output signal using an output transducer positioned at a second position along the pipeline, the second position being spaced apart from the first position along a length of the pipeline, the measured attribute being a frequency of the pressure wave;

c) analyzing a frequency response of the output signal, the analyzing of the frequency response including comparing a magnitude response of the pressure wave at various frequencies in a nominal pipeline with a magnitude response of the pressure wave at the various frequencies in the pipeline, the comparing showing that resonant peaks of the magnitude response of the pressure wave in the pipeline are shifted to lower frequencies than the resonant peaks of the magnitude response of the pressure wave in the nominal pipeline when the resonant peaks are in a range of 0.1 to 200 Hz; and d) determining, based on the analysis of the frequency response, if the sidewall between the input transducer and output transducer has erosion.

2. The method of claim 1, further comprising further analyzing the frequency response of the output signal in the frequency domain to determine a magnitude of the erosion.

3. The method of claim 1, further comprising analyzing an impulse response of the output signal to determine a location of the defect relative to at least one of the input and output transducers.

4. The method of claim 3, wherein analyzing the impulse response of the output signal to determine the location of the defect comprises analyzing the impulse response of the output signal in a time domain.

5. The method of claim 1, wherein the output signal is a wide band signal averaged over a period of time.

6. The method of claim 1, wherein the output signal is an impulse signal averaged over a period of time.

7. The method of claim 1, wherein analyzing the frequency response of the output signal in the frequency domain provides an aggregate thickness of the pipeline over a distance between the first position and the second position.

* * * * *